United States Patent [19]

Kamigaito et al.

[11] Patent Number: 4,697,325
[45] Date of Patent: Oct. 6, 1987

[54] METHOD FOR JOINING CERAMIC PARTS TO METALLIC PARTS

[75] Inventors: Osami Kamigaito; Haruo Doi; Shoji Noda, all of Aichi, Japan

[73] Assignee: Kabushiki Kaisha Toyota Chuo Kenkyusho, Aichi, Japan

[21] Appl. No.: 5,396

[22] Filed: Jan. 9, 1987

Related U.S. Application Data

[63] Continuation of Ser. No. 772,410, Sep. 4, 1985, abandoned.

[30] Foreign Application Priority Data

Nov. 5, 1984 [JP]  Japan ................................. 59-233853

[51] Int. Cl.⁴ ............................................... B23P 11/02
[52] U.S. Cl. .................................. 29/447; 29/156.8 R; 29/458; 29/525; 403/273; 427/38
[58] Field of Search ............ 29/447, 525, 458, 526 R, 29/156.8 R, 446, 156.8 CF; 403/273; 427/38

[56] References Cited

U.S. PATENT DOCUMENTS

| | | | |
|---|---|---|---|
| 1,191,547 | 7/1916 | Weideman | 29/458 |
| 2,274,961 | 3/1942 | Harger | 29/458 |
| 3,099,083 | 7/1963 | DeLong | 29/458 |
| 3,317,988 | 5/1967 | Endres | 29/447 X |
| 3,371,413 | 3/1968 | Rundle | 29/447 X |
| 4,167,351 | 9/1979 | Bindin | 29/447 X |
| 4,402,994 | 9/1983 | Kobayashi et al. | 427/38 |
| 4,468,309 | 8/1984 | White | 427/38 X |
| 4,480,010 | 10/1984 | Sasanuma et al. | 427/38 X |
| 4,518,315 | 5/1985 | Kruger | 403/273 X |
| 4,526,624 | 7/1985 | Tombrello et al. | 427/38 |
| 4,532,149 | 7/1985 | McHarque | 427/38 |
| 4,566,925 | 1/1986 | Schnabel et al. | 29/447 X |

FOREIGN PATENT DOCUMENTS 2734747  2/1979  Fed. Rep. of Germany ...... 403/273

Primary Examiner—Charlie T. Moon
Attorney, Agent, or Firm—Oblon, Fisher, Spivak, McClelland & Maier

[57] ABSTRACT

A method for joining a ceramic material to a metallic material includes: forming a metallic film on the surface of the joining area of the ceramic material; irradiating the metallic film with high energy ions to allow the metallic film to stick firm to the surface of the ceramic material and to strengthen the surface of the ceramic material; and mechanically joining the ceramic material to the counterpart metallic material through the metallic film. The ceramic material subjected to these steps hardly breaks at the joining area where breaking otherwise occurs easily, thus enabling high-strength joining of ceramic and metallic materials.

13 Claims, 1 Drawing Figure

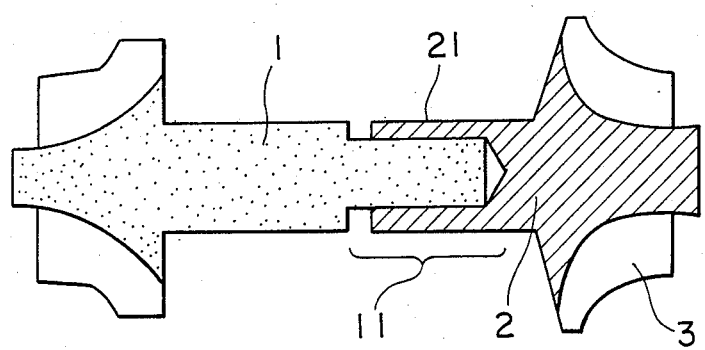

METHOD FOR JOINING CERAMIC PARTS TO METALLIC PARTS

This application is a continuation of application Ser. No. 772,410 filed on Sept. 4, 1985, now abandoned.

FIELD OF THE INVENTION

The present invention relates to a method for joining ceramic parts to metallic parts.

BACKGROUND OF THE INVENTION

Ceramic materials such as silicon nitride, silicon carbide and the like have been said to be prospective materials as structural parts because they have excellent heat resistance and heat shock resistance. They have begun to be used, for example, as diesel engine parts in reality. However, it is preferred in respect of manufacturing technology and of manufacturing cost to use a ceramic material for a part requiring heat resistance and use a metallic material for a part requiring no heat resistance in such parts.

For that purpose, a method for joining a ceramic material to a metallic material becomes necessary. As the joining method, brazing through a metallizing method or the like, welding such as fusion welding and solid phase welding, a joining method with an inorganic adhesive or the like, shrinkage fit, and the like are known. Of these, the shrinkage fit method is the simplest method. With plate parts, a method for fastening them with bolts and nuts is also carried out.

However, when a ceramic material is subjected to shrinkage fit or is fastened with bolts and nuts, a compressive stress is formed in a surface of ceramic material in which the ceramic material is pressed by a metallic material and a tensile stress is formed in a free surface adjacent to the above-mentioned surface, in which the stress distribution condition shows a rapid change from compression to tension. Therefore, the ceramic material has a mechanically weak region and it breaks easily in the above-mentioned surface region under the above-mentioned condition.

The applicant filed the application (U.S. Application No. 694,759) for the invention of a method for sticking a metallic film firm to a ceramic material and at the same time, for improving the toughness of the ceramic material by forming a metallic film on the surface of ceramic material and irradiating it with high energy ions from above it.

The inventors had an idea that, if the above-mentioned invention was applied to joining of a ceramic material to a metallic material, it would be possible to reduce tensile stresses formed on the surface of ceramic material and to prevent the breakage of ceramic material in its joining area.

SUMMARY OF THE INVENTION

The inventors devoted themselves to studies on realizing of the idea and as a result, have completed the invention.

The object of the invention is to provide a method for joining ceramic parts to metallic parts which enables the preventing of breakage of ceramic parts in their joining area.

The present invention consists of the first invention and the second invention.

The first invention is a method for joining ceramic parts to metallic parts comprising forming a metallic film on the surface of ceramic material in its joining area, irradiating the surface of the metallic film with high energy ions to stick the metallic film firm to the ceramic material, and joining the ceramic material to the metallic material through the metallic film held between the both materials.

The second invention is a method for joining ceramic parts to metallic parts which comprises forming a metallic film on the surface of ceramic material in its joining area, irradiating the surface of the metallic film with high energy ions to stick the metallic film firm to the ceramic material, plating the surface of the metallic film with a metal after the surface is etched, and joining the ceramic material to the metallic material through the plated metallic film held between the both materials. The second invention is the joining method constituted by adding a plating process to the first invention.

According to the invention, even if a ceramic material is fastened tightly to a metallic material, the breakage of the ceramic material occurs very little.

BRIEF DESCRIPTION OF THE DRAWING

The drawing shows an example and it is a sectional view of an exhaust turbine as a ceramic material and a compression turbine as a metallic material.

DETAILED DESCRIPTION OF THE INVENTION

The invention will be described in detail hereinafter.

Ceramic materials for use in the invention are represented by oxide ceramics materials such as aluminum oxide ($Al_2O_3$), zirconia ($ZrO_2$), and the like and by non-oxide ceramics materials including silicon nitride ($Si_3N_4$) and silicon carbide (SiC) as main materials. These ceramic materials are sintered bodies of powder compact of the above-mentioned substances which has a desired form. The sintered bodies may contain a sintering assistant such as yttrium oxide or the like and other additive components. They may also be prepared by any method such as normal pressure sintering, hot press, or the like.

A film formation process is applied to a part of a ceramic material which includes its joining area to the counterpart metallic material to form a metallic film. The metallic film is formed over a site taking part directly in the joining and over a part in which tensile stresses are formed by the joining, that is, a part adjacent to the joining area. As a metal for forming the metallic film, any so-called metal may be used. However, to obtain a larger effect of the invention, titanium(Ti), zirconium(Zr), hafnium(Hf), vanadium(V), niobium(Nb), chromium(Cr), nickel (Ni), and cobalt(Co) are preferred.

As a method for forming the above-mentioned metallic film, a physical vapor deposition (PVD) method such as electron beam vapor deposition method, sputtering vapor deposition method or the like may be used or a chemical gaseous phase vapor deposition(CVD) method may be used. It is preferred to purify a site where a metallic film is to be formed, by washing with acetone or the like prior to the film formation. After that, a metallic film is formed by the above-mentioned method. The thickness of a film formed varies with the energy amount of irradiated ions in the next process and it is not determined simply. However, the practical thickness of film is within the range of 0.1–0.5 microns. It is best to select the thickness of film in connection with joining accuracy in a joining process. If the thickness of film is too thin, it becomes difficult to form a uniform film, unevenness in a film occurs easily and a film effect of reducing stress concentration occuring in the joining area of a ceramic material is not displayed. On the other hand, if the film thickness is too thick, a problem arises that the energy of irradiated ions has to be extremely increased. A metallic film formed on a ceramic material is not stuck firm to the ceramic material in usual cases so that, when the film is scratched, it is sometimes peeled off. Therefore, the metallic film must be handled carefully.

Next, in the ion irradiation process, the above-mentioned metallic film is irradiated with high energy ions. For the ion irraddiation, for example, a Cockcroft type accelerator, a Van de Graaf generator, a linear accelerator, a cyclotron, or the like can be used. As the irradiated ions, any ions able to be accelerated readily in an electric field are usuable. In particular, irradiating operation for ions in a gaseous state at a normal temperature is simple. As the type of ions, specifically there may be mentioned nitrogen(N), neon(Ne), argon(Ar), xenon(Xe) and the like. Besides, metallic ions such as titanium(Ti), nickel(Ni), chromium(Cr), selenium(Ce), and the like can be used. It is best to determine the magnitude of energy to be imparted to irradiated ions so that the distance of ion penetration into a metallic film is equal to about 1.0-1.1 times the film thickness. As a result, mixing of atoms in the boundary surface between the ceramic material and the metallic film is caused by the ions and the both materials are stuck firm with each other. Therefore, it is preferred that the magnitude of energy given to ions is about 30 KeV-50 MeV. It is best that the dosage of high energy ions irradiated is about $1 \times 10^{13} - 1 \times 10_{18}$ ions per/cm$^2$ of irradiated area. If ions are irradiated in excess of the above-mentioned dosage, an effect proportional to the dosage cannot be obtained. If the dosage of ions irradiated is less than the above-mentioned dosage, the effect of ion irradiation cannot be obtained. When the ion irradiation process is applied to a metallic film, the metallic film is stuck firm to the ceramic material and it is hardly peeled off even if it is scratched with a diamond needle.

After the ion irradiation process, the joining process is carried out in the first invention and the plating process is carried out in the second invention. In the plating process, first, an extremely thin layer is removed from the metallic film irradiated with ions to purify the surface of metallic film. It is best to etch the surface of metallic film about 1000 Å by polishing with fine abrasive grains or by sputtering with an inert gas such as argon as a method of removing the thin layer. After that, a relatively soft metal such as nickel(Ni) or copper(Cu) is plated on the surface of the metallic film in a deposit thickness of about 0.5-50 microns. The plating layer works as a buffer material between the joined materials.

After the above-mentioned process is applied, the joining process is applied to the ceramic material. The joining process is a process for joining a ceramic material with a metallic material by fastening with bolts and nuts or by shrinkage fit. It is preferred that the joining area of ceramic material to a metallic material is fastened by shrinkage fit or fastened by bolts and nuts with the ceramic material held between the metallic materials.

With shrinkage fit, a normal temperature there is an interference in the inner diameter of metallic material necessary for the shrinkage fit between the ceramic material and the metallic material. The interference in the inner diameter of metallic material is reduced or allowed to disappear by heating the metallic material and the ceramic material is inserted into the metallic material. An interference in the inner diameter of metallic material necessary for the shrinkage fit is preferably determined to be in the range of about 5-10 microns at the maximum use temperature when the shrinkage fit is carried out between a cylindrical metallic material and a ceramic column material. It is natural that the ceramic material may be broken when the above-mentioned shortage in the inner diameter of metallic material necessary for the shrinkage fit is too large. Therefore, the interference amount should be determined carefully.

The second invention has an advantage that the interference in the inner diameter of metallic material necessary for the shrinkage fit can be controlled by the thickness of plating layer.

On the other hand, in the case where a ceramic material is fastened by screws with the ceramic material put between the metallic materials, care should be taken not to fasten the ceramic material too tightly, in order to avoid its breakage. In any form of joining, it is necessary that a metallic film is present between the metallic material and the ceramic material in the joining area of ceramic material to the metallic material. Further, it is best that the metallic film is further formed about 10 mm in excess toward the ceramic material side from the end part of metallic material. As mentioned above, the metallic film is stuck firm to the ceramic material due to ion irradiation applied to the metallic film. The stress concentration hardly occurs due to the presence of the metallic film, so that formation of cracks in and near the joining area of the ceramic material to the metallic material is repressed. As a result, the strength of the joining area is improved. As the material of the metallic material, it is, in general, iron but an aluminum alloy or a copper alloy may be used. The invention is useful for the joining of low-temperature parts to high-temperature parts such as, for example, the joining of a metallic compression turbine shaft to a ceramic exhaust gas turbine shaft in a super charger for an internal combustion engine.

In the joining area of ceramic material to the metallic material when the method of the first invention is carried out, the value of tensile stress formed by the joining force in the ceramic material is reduced and the degree of stress concentration in the ceramic material is lowered as compared with the case where the metallic film formation process and the ion irradiation process are not carried out. Therefore, execution of the method of the first invention results in improvement in the breakage resistance of the ceramic material.

Further, if the method of the second invention in which the plating process is added to the method of the first invention is carried out, the resulting united object bears a larger load and has further improved breakage resistance.

EXAMPLE

Example 1

As shown in the drawing, a silicon nitride exhaust gas turbine 1 having a rod-shaped ceramic joining area 11 of diameter of 15 mm was joined by shrinkage fit to a SCM 5 shaft part having a cylindrical metallic joining area 21 of wall thickness of 2 mm. After the outer surface of the joining area 11 was polished to surface roughness of about 0.3 s, the film formation process by electron beam vapor deposition was applied to the surface of the area 11 and subsequently the ion irradiation process with a Cockcroft type accelerator was applied to the resulting metallic film under conditions as shown in test numbers 1-6 of the table set forth below. In the film formation process and in the ion irradiation process, the joining area 11 was rotated at 10 rpm for formation of the metallic film of uniform thickness and for carrying out of uniform ion irradiation.

After that, the metallic joining area 21 was heated to 600° C., and fit around the ceramic joining area 11 to prepare a united article, which was then subjected to cool. Thus, a turbine for a super charger was obtained. After the turbine was fitted to a super charger and operated at 150.000 rpm, it was removed again from super charger and its flexural strength was measured. The results are shown in the lowest section of the table.

As the comparative example, a sample of the above-mentioned turbine for a turbo charger was prepared only by the shrinkage fit without carrying out of the film formation process and the ion irradiation process, and the sample was represented by the test number C1. Its flexural strength was determined.

TABLE

| Sample No. | 1 | 2 | 3 | 4 | 5 | C1 |
|---|---|---|---|---|---|---|
| Vapor deposited metal | Ti | Zr | Cr | Nb | Ni | — |
| Metallic film thickness (micron) | 0.40 | 0.26 | 0.26 | 0.28 | 0.22 | — |
| Ion type | $N^+$ | $Ar^+$ | $N^+$ | $N^+$ | $N^+$ | — |
| Acceleration voltage (k V) | 250 | 400 | 250 | 250 | 250 | — |
| Ion irradiation dosage (1/cm$^2$) | $1 \times 10^{17}$ | $5 \times 10^{15}$ | $7 \times 10^{16}$ | $7 \times 10^{16}$ | $5 \times 10^{16}$ | — |
| Flexural strength (kg/mm$^2$) | 65 | 64 | 60 | 63 | 60 | 50 |

These results indicates that the execution of the above-mentioned film formation process and ion irradiation process increases the flexural strength.

Example 2

After a metallic film was formed on the joining area of a ceramic material and subsequently it was irradiated with ions under the same conditions as in Sample No. 1 or 5, the surface of the metallic film was sputter-etched with argon to remove the outermost layer of the surface about 100 Å thick. After that, an electroless Ni plating layer of thickness of 5 microns was plated on the Ti metallic film or a Cu plating layer of thickness of 10 microns was wet plated on the Ni metallic film. The thus processed ceramic material was joined to the same metallic shaft part with an interference as in Example 1 under the same shrinkage fit conditions as in Example 1 and the turbine for a super charger was obtained. After the turbine was operated under the same condition as in Example 1, the flexural strength was measured. As a result, the turbine prepared through a process for plating Ni on the Ti metallic film had flexural strength of 70 kg/mm$^2$ and the turbine prepared through a process for plating Cu on the Ni metallic film and flexural strength of 65 kg/mm$^2$.

What is claimed is:

1. A method for producing a jointed article composed of a ceramic article and a metallic article, said ceramic article being selected from the group consisting of aluminum oxide (Al$_2$O$_3$), zirconium oxide (ZrO$_2$), silicon nitride (Si$_3$N$_4$), and silicon carbide (SiC), which comprises the steps of:

forming a metallic film on the surface of said ceramic article over a joining part and a part adjacent to the joining part where tensile stresses are formed as the result of the subsequent joining step, said metallic film being formed of at least one metal selected from the group consisting of Ti, Zr, Hf, V, Nb, Cr, Ni and Co, and having a thickness of 0.1 to 0.5 μm;

irradiating the surface of said metallic film with high-energy ions causing mixture of atoms between said metallic film and said ceramic article so as to fast adhere said metallic film and said ceramic article; and joining said ceramic article to said metallic article through said metallic film held between said ceramic article and said metallic article so as to produce said jointed article composed of both articles fixedly fitted under pressure, thereby preventing the breakage of said ceramic surface near the end of said metallic article.

2. A method according to claim 1, wherein said ions are selected from N, Ar, Ne, and Xe ions.

3. A method according to claim 2, wherein said irradiating is carried out with the distance of ion penetration into said metallic film being 1 to 1.1 times the thickness of said metallic film.

4. A method according to claim 3, wherein the dosage of said ions is in the range of $1 \times 10^{13}$ to $1 \times 10^{18}$ ions/cm$^2$.

5. A method according to claim 4, wherein said joining under pressure is carried out by shrinkage fit.

6. A method according to claim 4, wherein said joining under pressure is carried out by fastening with bolts or nuts.

7. A method according to claim 1, wherein said metallic film is formed by physical vapor deposition or chemical vapor deposition.

8. A method according to claim 7, wherein said ceramic article is a turbine shaft in a super charger for an internal combustion engine.

9. A method according to claim 3, further comprising, after the step of said irradiating, subjecting the surface of said metallic film to plating.

10. A method according to claim 9, wherein said plating forms at least one metallic film selected from Cu and Ni.

11. A method according to claim 10, wherein said ceramic article is selected from aluminum oxide (Al$_2$O$_3$), zirconium oxide (ZrO$_2$), silicon nitride (Si$_3$N$_4$), and silicon carbide (SiC), and the dosage of said ions is in the range of $1 \times 10^{13}$ to $1 \times 10^{18}$ ions/cm$^2$.

12. A method according to claim 11, wherein said metallic film is formed by physical vapor deposition or chemical vapor deposition.

13. A method according to claim 12, wherein said ceramic article is a turbine shaft in a super charger for an internal combustion engine.

* * * * *